May 15, 1962  W. W. WARD  3,034,653
FILTER FLOW CONTROL
Filed July 29, 1960  2 Sheets-Sheet 1

*INVENTOR.*
WOODROOW W. WARD
BY *Hazard & Miller*
ATTORNEYS

United States Patent Office 3,034,653
Patented May 15, 1962

3,034,653
FILTER FLOW CONTROL
Woodrow W. Ward, 7334 Coldwater Canyon,
North Hollywood, Calif.
Filed July 29, 1960, Ser. No. 46,188
1 Claim. (Cl. 210—332)

This invention relates to improvements in filters, particularly to filters of the type that are used for filtering water in swimming pools but which may be used for filtering other liquids.

Explanatory of the present invention, a popular filter used to filter the water in swimming pools consists essentially of a receptacle or container into which the water from the swimming pool continuously overflows. Within the receptacle there is a central vertical tubular member that serves to support a plurality of filtering envelopes or plates. These envelopes or plates are usually in the form of spaced pairs of opposed screens connected to each other at their peripheral edges. A filter aid such as diatomaceous earth is supplied to the water that flows into the receptacle from the swimming pool, and such filter aid collects on the exterior of the screen envelopes or plates. The filtered water, after passing through the envelopes or plates, enters the tubular member which leads to the outlet from the receptacle and is returned to the swimming pool. With continued use various impurities collect on the filter aid to such an extent that it is necessary to remove the filter aid and replace it with a new and clean filter aid. One method of removing the spent filter aid has been to "backwash" or reversely direct water through the filter so as to remove the filter aid from the screen envelopes or plates. This method is objectionable because of the fact that so much water is unnecessarily used to "backwash" and it is consequently wasted.

Another method of removing the filter aid has been to remove the tubular central support and its attached envelopes or plates and hose the filter aid off of the envelopes.

Still another method has been to rotate the tubular support and its attached envelopes or plates in their receptacle to thus spin the tubular support and plates in the water in the receptacle and thus remove or wash off the filter aid. This has ordinarily involved an unnecessary waste of water due to the fact that flow has been permitted to continue through the filter during the spinning.

An object of the present invention is to provide an improved filter wherein the tubular support that supports the envelopes or plates can be spun in their receptacle for the purpose of removing the filter aid and to provide a valve means which will close the normal exit for filtered water to the outlet and simultaneously open the receptacle to the outlet when the removal of the filter aid is taking place. In this manner the filter may be cleaned in place in the receptacle but without involving an unnecessary waste of water.

With the foregoing and other objects in view, which will be made manifest in the following detailed description and specifically pointed out in the appended claim, reference is had to the accompanying drawings for an illustrative embodiment of the invention, wherein:

Referring to the accompanying drawings wherein similar reference characters designate similar parts throughout, 10 indicates the receptacle of the filter which may receive water from a swimming pool S through an overflow outlet O.

Figure 1:
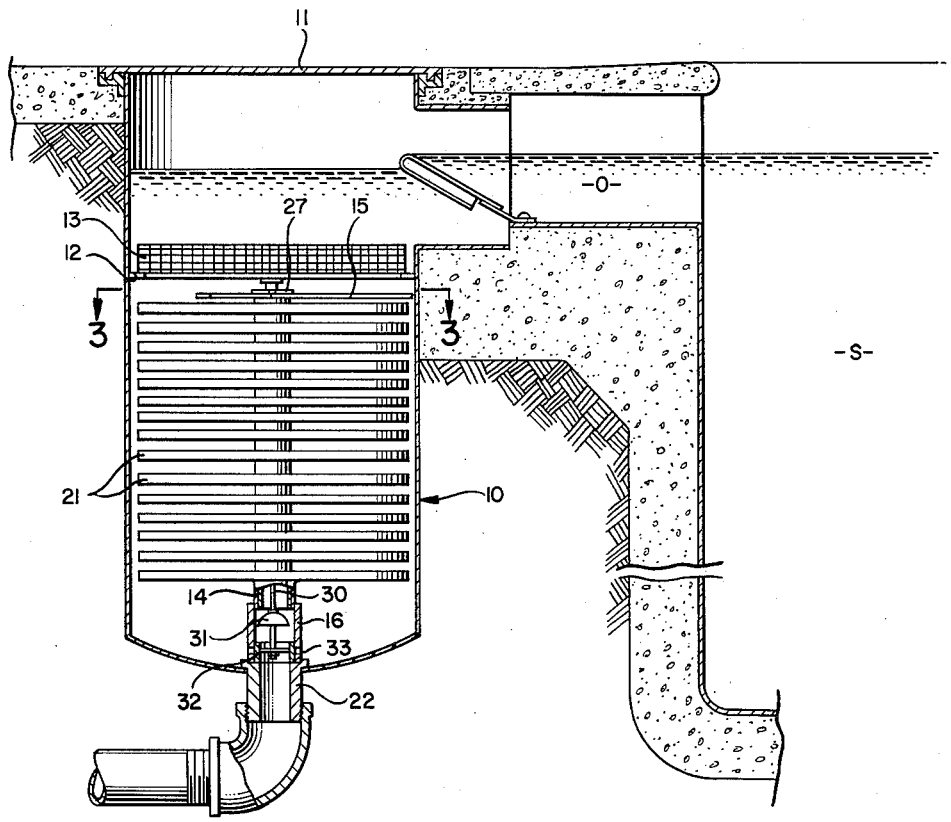
FIGURE 1 is a sectional view through a filter embodying the present invention, illustrating the construction in its normal position of filtering water from a swimming pool.
Figure 3:
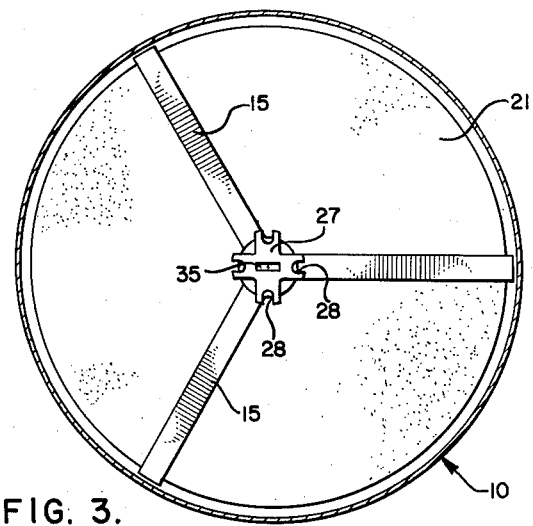
FIG. 3 is a horizontal section taken substantially upon the line 3—3 upon FIG. 1.
Figure 5:
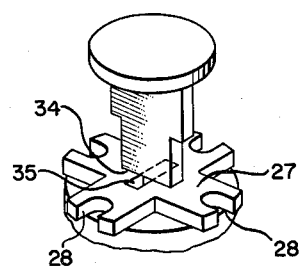
FIG. 5 is a perspective view of a detail of construction.

The receptacle 10 has a removable cover 11 and usually there is a shoulder 12 in the interior of the receptacle that serves to support a screen basket 13 in which large elements of debris may be caught and removed from the filter when the cover 11 is opened. Within the receptacle there is mounted a tubular support 14 that is supported at its top such as by a spider 15 and is rotatably mounted at its bottom by means of a fitting 16. This tubular support serves to support plates or envelopes formed of opposed sections of screen 17 connected to each other adjacent their outer ends as at 18 and held spaced from each other by suitable spacers, not shown. The space between opposed screens 19 communicates with apertures 20 in the tubular support 14. Usually a filter aid is supplied to the water that enters the receptacle 10, and this filter aid indicated at 21 collects on the exteriors of the screens. The water, after having passed through the basket 13, passes through the filter aid 21 and through the screens and finds egress through the apertures 20 to the interior of the tubular support 14 where it may pass to the outlet 22 that leads to a pump 23 and through a three-way valve 24. One branch of this valve indicated at 25, returns filtered water to the swimming pool S. The other branch 26 may lead to waste. In accordance with the present invention the top of the tubular member 14 is equipped with a fitting 27 having notches 28 to receive a spanner wrench 29 by which the tubular member 14 can be repeatedly rotated within the receptacle 10 when it is desired to remove the filter aid 21 from the screens.

Figure 2:
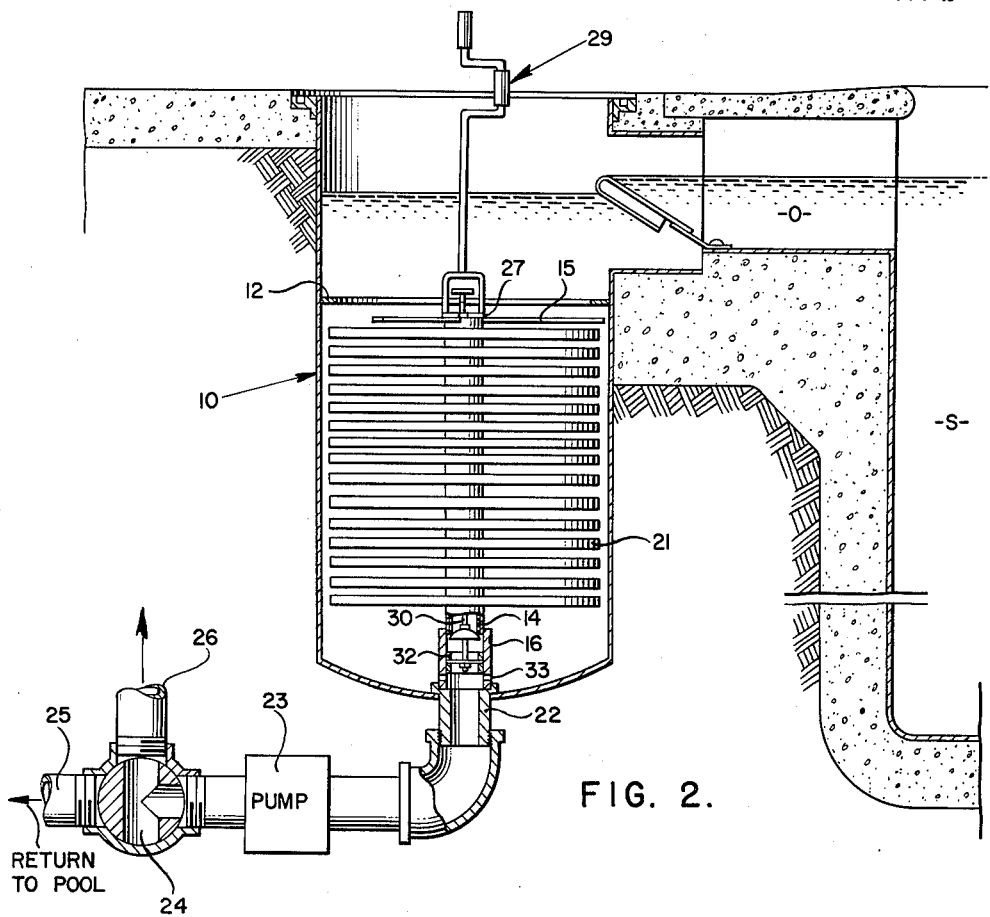
FIG. 2 is a view similar to FIG. 1, but illustrating the parts in the position they assume when the filter is being cleaned.
Figure 4:
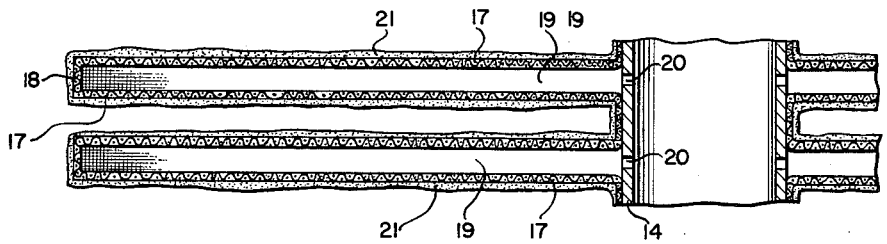
FIG. 4 is a partial view in vertical section and on an enlarged scale illustrating a portion of the filter.

Inside of the tubular member 14 there is a rod 30 on which is mounted a valve closure 31 adapted to seat against a valve seat on the bottom of the tubular member. This rod also has mounted on it a sleeve valve 32 that is movable into or out of registry with apertures 33 in the fitting 16. The rod 30, when in its lowermost position illustrated in FIG. 1, positions the sleeve valve 32 so that it closes the apertures 33 and holds valve closure 31 in its open or unseated position. In this position the filtered water that has entered the tubular support 14 after passing through the filter aid and screens is conducted to the pump and pumped thereby back to the swimming pool through the branch 25. When it is desired to clean the filter and remove the filter aid the rod 30 is lifted and is held in its elevated position by partially rotating it so as to position the flatted portion 34 on top of the fitting 27 and out of alignment with the slot 35 that normally receives it. This holds the valve closure 31 in seated position and lifts the sleeve valve 32 into a position out of registry with the apertures 33 as illustrated in FIG. 2. While the rod is held in this position the spanner wrench 29 is applied and the tubular support and its attached screens are repeatedly spun in the receptacle 10. This spinning action occurs while the receptacle 10 is filled with water and the filter aid 21 is quickly washed therefrom. The water in the receptacle and the released filter aid are then conducted through the apertures 33 to the pump 23 and are pumped to waste through the branch 26. Thereafter, the rod 30 is turned and allowed to lower, returning the valves 31 and 32 from the position shown in FIG. 2 to the position shown in FIG. 1. Fresh filter aid is then supplied to the water and a new filter cake is allowed to build up on the screens 17.

It will be appreciated from the above-described construction that it is not necessary to remove the tubular support 14 and its screens from the receptacle, and that the filter may be cleaned by spinning these parts in place. The excessive loss of water heretofore occasioned by "backwashing" is completely avoided. Furthermore, as the interior of the tubular support 14 is closed during the spinning operation, contamination of water inside of the filter during the cleaning is effectively avoided.

In the above-described construction the water is induced to flow through the filter partially by gravity and partially by the suction of the pump 23. It will be appreciated, however, that the present invention is not restricted thereto but may be employed in conjunction with filters of the pressure type wherein the water to be filtered is forced through the filter under pressure.

Various changes may be made in the details of construction without departing from the spirit and scope of the invention as defined by the appended claim.

I claim:

A filter comprising a housing having an inlet and an outlet, a tubular member mounted in the housing for axial rotation therein and communicating with the outlet, filter elements mounted on the tubular member internally communicating with the interior of the tubular member, said filter elements being adapted to be rotated by the tubular member in the housing when the tubular member is rotated to clean the filter elements, a rod axially movable in the tubular member, a valve seat in the lower end of the tubular member, a valve closure on the rod adapted to seat on the seat when the rod is lifted relative to the tubular member and to open the interior of the tubular member to the outlet when the rod is lowered relative to the tubular member, a sleeve valve on the rod adapted to open the interior of the housing to the outlet when the rod is lifted and to close the housing to the outlet when the rod is lowered, means for holding the rod in elevated position, means on the tubular member by which the tubular member may be rotated, and a two-way valve in the outlet.

References Cited in the file of this patent

UNITED STATES PATENTS

| | | |
|---|---|---|
| 617,133 | Vance | Jan. 3, 1899 |
| 2,651,418 | Prendergast | Sept. 8, 1953 |
| 2,826,307 | Pace | Mar. 11, 1958 |
| 2,869,570 | Wilkerson | Jan. 20, 1959 |
| 2,914,180 | Konopka et al. | Nov. 15, 1959 |

FOREIGN PATENTS

| | | |
|---|---|---|
| 548,006 | Belgium | June 15, 1956 |